US012024808B2

(12) United States Patent
Rupnow

(10) Patent No.: US 12,024,808 B2
(45) **Date of Patent: *Jul. 2, 2024**

(54) OZONE AND HYDROXYL INJECTION SYSTEMS

(71) Applicant: Omni Solutions LLC, Baraboo, WI (US)

(72) Inventor: Andrew Rupnow, Wisconsin Dells, WI (US)

(73) Assignee: OMNI Solutions LLC, Baraboo, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,123

(22) Filed: Apr. 18, 2023

(65) Prior Publication Data

US 2023/0250572 A1 Aug. 10, 2023

Related U.S. Application Data

(60) Continuation of application No. 16/422,228, filed on May 24, 2019, now abandoned, which is a division of (Continued)

(51) Int. Cl.

*D06F 35/00* (2006.01)
*C11D 3/04* (2006.01)

(Continued)

(52) U.S. Cl.

CPC .............. *D06F 35/001* (2013.01); *C11D 3/04* (2013.01); *C11D 3/044* (2013.01); *C11D 17/00* (2013.01);

(Continued)

(58) Field of Classification Search

CPC .. D06F 35/001; D06F 39/022; D06F 2103/22; D06F 33/37; C11D 3/04; C11D 3/044; C11D 17/00; C11D 2111/12

See application file for complete search history.

(56) References Cited

U.S. PATENT DOCUMENTS 3,707,856 A 1/1973 Niewyk
3,961,231 A 6/1976 Gillespie (Continued)

FOREIGN PATENT DOCUMENTS

CA 2310864 A1 2/2001
CN 102425064 A 4/2012

(Continued)

OTHER PUBLICATIONS

International Search Report in International Application No. PCT/US2017 /031609, mailed Aug. 16, 2017 (2 pages).

(Continued)

*Primary Examiner* — Joseph L. Perrin
*Assistant Examiner* — Irina Graf
(74) *Attorney, Agent, or Firm* — OMNI Solutions LLC

(57) ABSTRACT

An ozone and/or hydroxyl laundry system that injects ozone and/or hydroxyls into the chemical injection system in order to allow the system to inject ozone and/or hydroxyls as other cleaning chemicals are injected into the washer. This allows ozone and/or hydroxyls to be injected through the wash cycle rather than just during the initial fill phase and avoids the expense and maintenance of adding ozone and/or hydroxyls recirculation plumping to an ozone and/or hydroxyls laundry system. Accordingly, ozone and/or hydroxyl levels may be maintained at superior levels throughout the wash cycle.

12 Claims, 4 Drawing Sheets

Related U.S. Application Data application No. 15/149,444, filed on May 9, 2016, now Pat. No. 10,344,416.

(51) Int. Cl.

| | |
|---|---|
| ***C11D 17/00*** | (2006.01) |
| ***D06F 39/02*** | (2006.01) |
| *D06F 33/37* | (2020.01) |
| *D06F 103/22* | (2020.01) |

(52) U.S. Cl.

CPC ........ *D06F 39/022* (2013.01); *C11D 2111/12* (2024.01); *D06F 33/37* (2020.02); *D06F 2103/22* (2020.02)

(56) References Cited

U.S. PATENT DOCUMENTS

| | | | |
|---|---|---|---|
| 4,003,832 | A | 1/1977 | Henderson |
| 5,097,556 | A | 3/1992 | Engel |
| 5,181,399 | A | 1/1993 | Engel |
| 5,241,720 | A | 9/1993 | Engel |
| 5,765,403 | A | 6/1998 | Lincoln |
| 5,806,120 | A | 9/1998 | McEachern |
| 5,960,501 | A | 10/1999 | Burdick |
| 6,085,556 | A | 7/2000 | Moon |
| 6,115,862 | A | 9/2000 | Cooper |
| 6,685,825 | B1 | 2/2004 | Chang |
| 7,493,782 | B2 | 2/2009 | Daniels |
| 10,344,416 | B2 | 7/2019 | Rupnow |
| 2008/0092601 | A1 | 4/2008 | Konides et al. |
| 2010/0095715 | A1 | 4/2010 | Ulger |
| 2010/0329941 | A1 | 12/2010 | Moore |
| 2012/0017379 | A1 | 1/2012 | Moore |
| 2012/0094887 | A1 | 4/2012 | Tanaka |
| 2012/0231549 | A1 | 9/2012 | Miller |
| 2015/0033805 | A1 | 2/2015 | Rupnow |

FOREIGN PATENT DOCUMENTS

| | | | |
|---|---|---|---|
| KR | 20130074430 | A | 7/2013 |
| KR | 20150032039 | A | 3/2015 |
| WO | WO 2007/143785 | A1 | 12/2007 |
| WO | WO 2016/094658 | A1 | 6/2016 |

OTHER PUBLICATIONS

Written Opinion in International Application No. PCT /US-2017 /031609, mailed Aug. 16, 2017 (5 pages).

OZONE AND HYDROXYL INJECTION SYSTEMS

CROSS REFERENCE TO RELATED APPLICATIONS

This application is a continuation of U.S. patent application Ser. No. 16/422,228, filed May 24, 2019, which is a divisional of U.S. patent application Ser. No. 15/149,444, filed May 9, 2016, now U.S. Pat. No. 10,344,416, which is hereby incorporated by reference herein in its entirety.

FIELD

The present invention is directed to ozone and/or hydroxyl radical injection systems for laundry machines.

BACKGROUND

Ozone laundry machines are an alternative to regular washing machines that inject dissolved ozone gas ($0_3$) in the washing liquid of a washing machine. The dissolved ozone oxidizes the dirt and other soils on the laundry and cleans them quite effectively. Ozone laundry systems generally require the water to be at a much lower temperature than conventional washing machines and thus require far greater electricity. Accordingly, ozone laundry machines have become popular recently as an energy efficient alternative to washing machines.

SUMMARY

Recently, the inventors have discovered that in addition to injecting ozone gas into the feed lines, a true hydroxyl radical generator (e.g. that generates ozone gas at 900 ppm) may be utilized to inject hydroxyl radicals infused gas into the feed lines. Hydroxyl radicals are particularly advantageous because they do not produce potentially harmful byproducts that ozone generators do. Accordingly, implementing a laundry system with hydroxyl radicals will allow the laundry system to clean without testing the environment for ozone buildup.

Hydroxyl Radicals

The hydroxyl radical, •OH, is the neutral form of the hydroxide ion (OH—). Hydroxyl radicals are diatomic molecules that are highly reactive and short-lived with an average half-life of seconds. The hydroxyl radical which was first discovered by scientists in 1963 is often referred to as the "detergent" of the troposphere, or the lowest part of the atmosphere, because it reacts with many pollutants and helps destroy them. It also has an important role in eliminating some greenhouse gases like methane and ozone.

Atmospheric hydroxyl radicals should not be confused with free radicals that are produced inside living organisms. Atmospheric hydroxyl radicals are so reactive that they are instantly neutralized when they make contact with any substance and would be impossible to ingest as a complete ion. This is the fact that makes hydroxyl radicals, which are in the outside air at all times during the day, one of the safest processes for deodorizing in an occupied area.

Hydroxyls are formed in nature by the reaction of UV light from the sun disassembling water vapor ($H_20$) to get a hydrogen atom and oxygen ($O_2$) which are combined together to form the hydroxyl radical (*OH).

Hydroxyl Radical Technology

Hydroxyl generators currently used, are utilized in the restoration industry for cleaning air that may have been polluted or contained. Hydroxyl generators currently utilized in the restoration industry incorporate UV light in the generation process. UV light has three major spectrums: A, B and C. UVA is in the 315 nm to 400 nm wavelength and is what is commonly referred to as a "black light," which makes white things glow and is considered safe for vision and skin contact. UVA lamps do not produce ozone. UVB is in the 280 nm to 315 nm wavelength. These are the lights in tanning salons. UVC is the 100 nm to 280 nm wavelength. These lamps are "germicidal" and can damage your eyes and skin. UVC lamps in the 185 nm spectrum produce large amounts of ozone.

Some manufacturers that claim to sell a hydroxyl generator use UVC lamps in the 185 nm to 254 nm wavelength without a catalyst and claim to make hydroxyls. However, these units primarily generate ozone, and few hydroxyls and are not true hydroxyl generators. Other manufacturers use the same spectrum range of UVC (185 nm to 254 nm) and but also incorporate reactive metals like titanium as a catalyst to create hydroxyls. These machines would probably make more hydroxyls then then the UVC system without a catalyst, but it still produces significant amounts of ozone.

Another hydroxyl generation technology developed by the National Aeronautics and Space Administration (NASA) utilizes UVC light in the 254 nm wavelength to excite nano-sized particles of Titanium Dioxide to generate hydroxyl radicals. This process has been deemed safe by NASA (it has been used in the space station) and also certified by the Federal Drug Administration (FDA) as a Type 2 Medical Device that is approved for use in hospitals, including neonatal and baby wards.

The safest and most preferred technology to produce hydroxyl radicals is a version of the NASA developed process that utilizes UVA (black light) in the 365 nm to 385 nm wavelength to excite (irradiate) nano sized Titanium Dioxide sol gel particles. Many scientists believe that UVA light is the best spectrum to produce the largest amount of hydroxyls possible with super reactive $TiO_2$. $TiO_2$ is the white powder on powdered donuts or the white in your tooth paste. Both the black light and the $TiO_2$ utilized in this technology are safe and benign. Hydroxyl radical generation systems that output hydroxyl radical charged gas are commercially available from suppliers such as Viqua.

Hydroxyl radical generation systems are typically used in the restoration industry to treat the air for mold, etc. However, it is known that generally it takes longer for a true hydroxyl radical generator system than an ozone system to clean a room. See for example, http://www.wondermakers-.com/Portals/O/docs/Hydroxy1%20Radicals%20Hype%20or%20Reality.pdf. Accordingly, while safer, hydroxyl radicals generally are thought of as being less effective cleaners than ozone generation systems.

Hydroxyl Radical Systems for Laundry

However, the inventor(s) have discovered that a laundry system utilizing hydroxyl radicals is in fact faster acting and more effective at cleaning after quantitative testing of the laundry. This was quite surprising, as in restoration systems where hydroxyl radical infused gas is introduced to the room, it takes longer. Accordingly, after experimentation, the inventor(s) have learned that hydroxyl radical gas that a system introduces into the feed lines is safe and more effective than ozone generation systems at cleaning laundry. Indeed, the hydroxyl radical systems are even faster acting.

Injection System Types for Ozone and/or Hydroxyl Laundry

Ozone and/or hydroxyls laundry machines utilize several different methods for introducing ozone and/or hydroxyls into the washing liquid during the wash cycle. Most ozone and/or hydroxyls laundry machines inject ozone and/or hydroxyls into the washing drum through the water fill lines. The water fill lines only fill up the washing drum during the initiation of the cycle, when the water is first released into the drum. Accordingly, the fill lines do not dispense water for the rest of the cycle. Accordingly, ozone and/or hydroxyls laundry machines that introduce ozone and/or hydroxyls through the fill lines are limited to a single injection period, during the fill cycle. Other ozone and/or hydroxyls washing machines either recirculate wash water and continually add ozone and/or hydroxyls to the wash water, or directly inject gas into the washer drum. However, each of these methods has several disadvantages that are explained below.

Indirect Injection

Systems that inject ozone and/or hydroxyls through the water fill lines, by for example, connecting a manifold to the water fill lines are called indirect or passive injection systems. Ozone and/or hydroxyls system that inject ozone and/or hydroxyls through these fill lines pose several problems. Particularly, ozone and/or hydroxyls systems with oxygen concentrators have a ramp up period, typically 20-60 seconds, to begin operating at an effective capacity. Additionally, washer fill times are from 1-5 minutes, which is a minimal amount of time to inject enough ozone and/or hydroxyls to effectively oxidize soils, bacteria, and viruses. According to the International Ozone and/or hydroxyls Association (IOA), a starting (without replenishing continuously) dissolved zone level 1 ppm of ozone in 15 gallons of water at 75 degrees that is vigorously agitated will revert back to oxygen within 2-4 minutes.

Therefore, there are many disadvantages of indirection ozone and/or hydroxyls injection systems that inject ozone and/or hydroxyls through the water fill lines. These include: (1) low dissolved ozone and/or hydroxyls levels for the majority of the wash cycle following a short time after filling, (2) low gas phase ozone and/or hydroxyls levels, (3) fast degeneration of ozone and/or hydroxyls due to high pH, (4), high in maintenance, and (5) adding the same amount of ozone and/or hydroxyls for each wash cycle, and lack of ability to customize ozone and/or hydroxyls levels for particular wash loads.

Charged Ozone and/or Hydroxyls

Charged ozone and/or hydroxyl systems are commonly used for drinking water applications and have recently been adapted for laundry. For example, charged ozone systems have a tank or reservoir that keeps dissolved ozone ($O_3$) levels around 2 ppm. To do this properly, a $DO_3$ controller is required. As indirect injection systems, charged systems inject during fill only, but achieve a higher ppm of $DO_3$ than indirect injection systems.

For both indirect and charged ozone and/or hydroxyl systems, the introduction of alkali detergents will cause the ozone and/or hydroxyls to off gas immediately. Ozone and/or hydroxyls do not dissolve or stay dissolved in water during the process in which pH is increased in traditional washing cycles. Alkali detergents used in laundry machines increase the pH level of the wash water to approximately 10 pH.

In an example wash cycle, the beginning pH is 7, alkali is added and increases the pH to 10 or more. While the pH is being increased by the alkali, the ozone is oxidizing, off gassing and reverting pass to $O_2$. Once the higher pH is achieved, it stabilizes the ozone in solution. Therefore, although the initial ppm of ozone and/or hydroxyls levels injected into the wash drum may be sufficiently high, once alkali detergents are added the ozone and/or hydroxyls levels will fall dramatically. Therefore, these methods that only introduce ozone and/or hydroxyls during the fill cycle have low ozone and/or hydroxyls levels for the majority of the ozone and/or hydroxyls cycle, especially once alkali detergent is added.

There are other disadvantages of charged ozone and/or hydroxyls systems that include: (1) large footprint, (2) they can damage the washer, (3) they are high in maintenance, and (4) they add the same amount of ozone and/or hydroxyls for each wash cycle, and their ozone and/or hydroxyls levels cannot be customized for particular wash loads.

Recirculation

Another type of ozone and/or hydroxyls system is recirculation systems. Recirculation systems continually recirculate the wash water as it is washing laundry and adding ozone and/or hydroxyls through values at certain points in the recirculation stream. Accordingly, recirculation systems may continually maintain ozone and/or hydroxyls levels in the wash water through the wash cycle. Therefore, they do not have many of the disadvantages of the two systems above that only inject ozone and/or hydroxyls during the wash cycle. However, recirculation systems are very complex to implement, expensive, and requires a licensed plumber to install. Lint ends up clogging the pumps, which require major maintenance. Furthermore, conventional recirculation systems add the same amount of ozone and/or hydroxyls for each wash cycle, and one cannot customize ozone and/or hydroxyls levels for particular wash loads.

Direct Injection

Finally, diffusion systems inject ozone and/or hydroxyls gas (not pre dissolved in water) directly into the sump of the washer continuously throughout each step of the wash cycle. Some diffusion systems use diffusion stones that produce micron sized gas bubbles. However, the diffusion stones often corrode over time and require maintenance. Furthermore, this system generally has lower dissolved ozone and/or hydroxyls gas levels, has high off-gassing potential (ambient ozone and/or hydroxyls gas can reach toxic levels) and generally add the same amount of ozone and/or hydroxyls for each wash cycle, and one cannot customize ozone and/or hydroxyls levels for particular wash loads.

Ozone and/or Hydroxyls Injected in Chemical Lines

Accordingly, a need exists for an ozone and/or hydroxyls injection system that has low maintenance, low installation costs, may vary the amount of ozone and/or hydroxyls injected per cycle, and keeps the ozone and/or hydroxyls levels at adequate levels through the wash cycle. Accordingly, systems and methods have been developed to allow ozone and/or hydroxyls gas to be injected at various stages and entry points along the chemical introduction systems and lines of the ozone and/or hydroxyls laundry system. The chemical lines inject the detergent and other chemicals used for laundry. The chemical lines are separate from the water fill lines and generally consist of several chemical drums with pumps that are fed into a manifold to be mixed with a chemical water inlet that is separate from the fill water inlet (which have different flow rates). The chemicals and water are then mixed to be injected into the washer drum. These injections take place during various phases of the wash cycle (e.g. during an eight minute cycle), accordingly, they serve as useful times to inject additional ozone and/or hydroxyls through the cycle.

Accordingly, ozone and/or hydroxyls may be introduced into the chemical lines at various stages of the chemical introduction system and by various methods. In some embodiments, the ozone and/or hydroxyls may be introduced into the chemical lines after the water and chemicals have mixed and exited the flush manifold. In those embodiments, the ozone and/or hydroxyls gas may be injected with an ozone and/or hydroxyls generator in conjunction with a venturi by-pass manifold or other dissolving system, or a UV ozone and/or hydroxyls generator. This ozone and/or hydroxyls introduction may then take place further downstream in the chemical lines to minimize off gassing through the process that might take place if introduced prior to mixing in the flush manifold or elsewhere in the system.

In other embodiments, the ozone and/or hydroxyls may be injected in the chemical water supply line upstream from the flush manifold that mixes the chemicals into the water supply. This will potentially allow more ozone and/or hydroxyls to dissolve in the water prior to adding alkaline or other chemicals that make dissolving the ozone and/or hydroxyls more difficult. In some embodiments, the UV based direct line introduction may be more beneficial downstream from the flush manifold and the venturi introduction may be more beneficial upstream where it needs to be dissolved.

This process may be performed at varying water and air temperatures. In some embodiments, cooler temperatures may be implemented to slow and stabilize ozone and/or hydroxyl reaction time. By injecting ozone and/or hydroxyls into the washer with the chemical dispensing system, the amount of ozone and/or hydroxyls introduced into the system may be varied depending on the soil levels of the laundry. The ability to control the amount of ozone and/or hydroxyls will be able to minimize the amount of off gassing while making sure an adequate amount is introduced into the washer drum in order to clean the laundry.

Organic load has a major impact on ozone and/or hydroxyl's performance. Heavy organic load causes ozone and/or hydroxyls to oxidize rapidly while light organic loads cause ozone and/or hydroxyls to oxidize at a slower pace. Integrating the ozone and/or hydroxyls adding site with the chemical dispensing line (which is continually adding chemicals during the ozone and/or hydroxyls wash process and thus allows the ozone and/or hydroxyls to be added continually through the laundry cycle) provides the ability to control the ozone and/or hydroxyls for different organic loads. This is important to combat heavy organic loads (add more ozone and/or hydroxyls) and prevent ozone and/or hydroxyls from off-gases into working environments on light organic loads (less ozone and/or hydroxyls added). The controller can be programmed to add ozone and/or hydroxyls either by timing a water solenoid valve to open and close, allowing more water to be treated (e.g. diffused) with ozone and/or hydroxyls and enter into the wash machine. In some embodiments, the controller can dose ozone and/or hydroxyls in ounces (similar to chemicals), and therefore a specific ozone and/or hydroxyls dosage amount can be applied for the individual wash step for each wash formula.

Each system set up may be slightly different for the end user, variables include: (1) linen/fabric type, (2) size of washer, (3) water quality, (4) soil contamination, and (5) washer manufacturer. This type of system also requires less maintenance than prior systems, will not damage machinery, and is cost effective.

Ozone and/or hydroxyls may be injected into washer machine every time the washer fills with water through water inlets on washer machine using an ozone and/or hydroxyls system with a venturi manifold or water passing over UV light. Dissolved ozone concentrations may be used between 0.1-5 PPM, or other suitable concentrations. Ozone and/or hydroxyls levels may then be controlled and maintained in the wash machine using the chemical pump controller and flush manifold. Water may be controlled by a solenoid valve from the chemical controller and pump. Ozone and/or hydroxyls is injected into the water via venturi or water passing over UV light. Ozone and/or hydroxyls dosage amounts may be programmed based on soil and contaminant load, adding more or less ozone and/or hydroxyls dissolved water with the programmer and controller. Ozone levels may be maintained between 0.1-5 ppm, or other suitable ranges with little to no off gassing of ozone and/or hydroxyls. In some embodiments, ozone and/or hydroxyls levels may be maintained at 1 ppm. System costs are dramatically less expensive with little to no maintenance costs.

Hydroxyl concentrations may be maintained in the drum from 0.1-5 ppm. In some embodiments, hydroxyl concentrations may be maintained at 0.1-0.5 ppm. The inventors have discovered quite optimal results for hydroxyl concentrations at this range. Typical hydroxyl generators generate hydroxyls gas having a 900 ppm hydroxyl concentration. Accordingly, once this is diffused into the chemical and/or water fill lines and emptied into the washing drum, the concentration can be maintained at 0.1-0.5 ppm.

The concentration is maintained at these levels using injection cycles of hydroxyl gas from 60 seconds-99 seconds of flow time. This is because during various stages after the initial fill of the wash drum, the chemical injection,

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

In the drawings, the same reference numbers and any acronyms identify elements or acts with the same or similar structure or functionality for ease of understanding and convenience.

DETAILED DESCRIPTION

Figure 1:
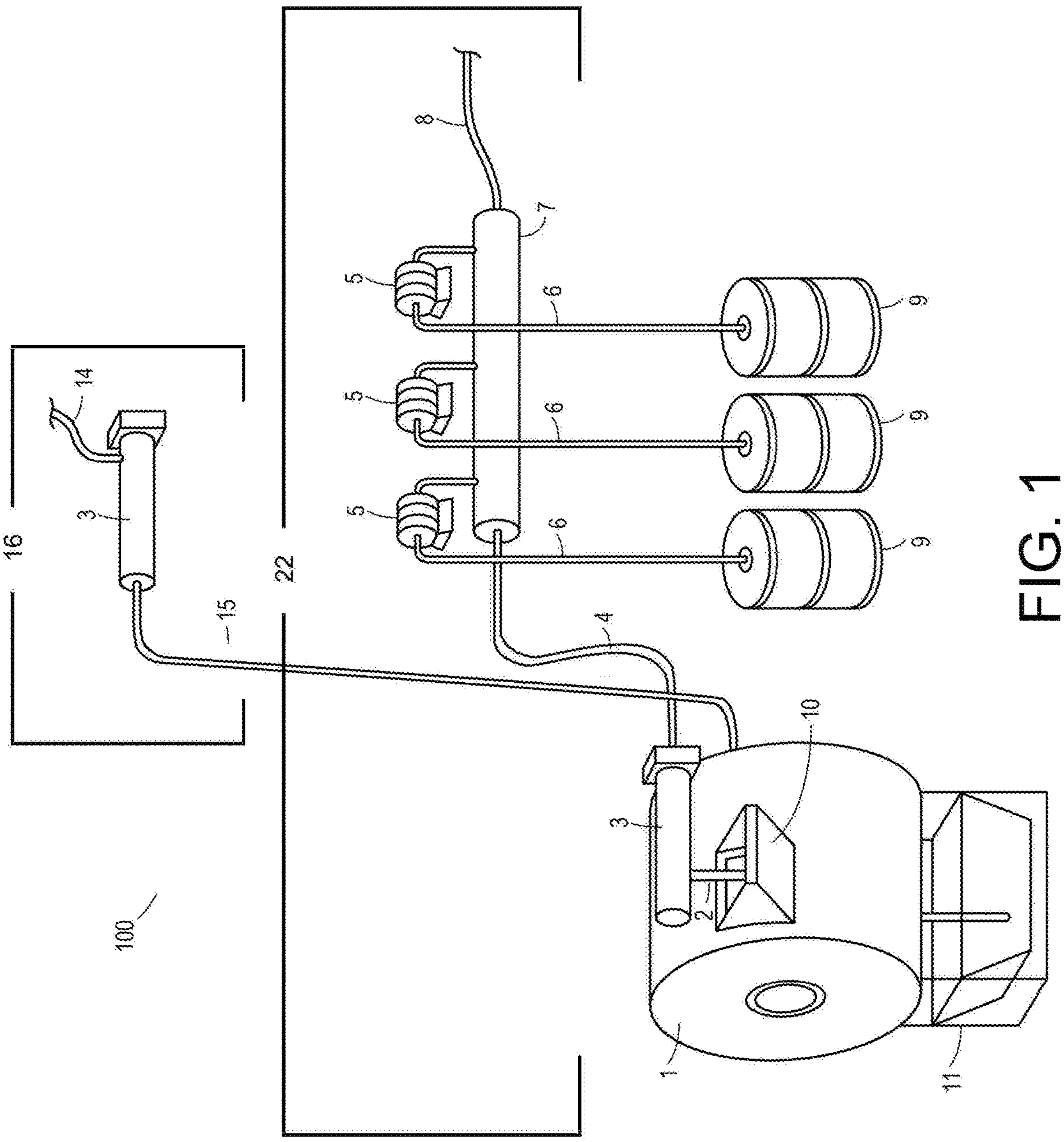
FIG. 1 is a diagram of an embodiment of an ozone and/or hydroxyls laundry machine according to the present disclosure.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Overview of System

FIG. 1 illustrates an example of an ozone and/or hydroxyls laundry system 100 that introduces ozone and/or hydroxyls in the chemical supply lines using a UV ozone and/or hydroxyls generator. Included is a wash drum 1 for depositing soiled laundry and wash liquid, a washer base and sump 11. The ozone and/or hydroxyls laundry system 100 may include at least two supply lines: (1) a water fill lines 16 that introduces water to fill the wash drum 1 during the initiation phase and (2) a chemical line 22 that introduces detergent, bleach and other chemicals into the wash drum 1 during the laundry cycles.

Ozone and/or Hydroxyls Introduction Into Fill Lines

When a laundry cycle is determined, a control system on the washer will be selected for a specific cycle. The same cycle may then be input into a control system for the chemical supply line. Then, once the soiled laundry has been deposited in the wash drum 1, and the cycle is initiated, the fill water inlet 15 will begin filling the wash drum 1. To do this, a valve on or connected to the fill water supply line 14 or elsewhere on the water fill lines 16 will open and allow the wash drum 1 to fill with water. In some embodiments, there may be different fill levels depending on the amount of laundry. Generally, water fill lines 16 only contain an on/off valve that has quite a high rate of flow that fills the wash drum 1 quickly. This is because that is all that is required is an on/off valve for filling, and it is more expensive to implement a control system to more closely regulate the fill lines—which is not necessary. In other embodiments, there may be more specialized or closely regulated fill lines.

Once the valve is open and fill water begins to start following through the fill water inlet 15, a venturi or other introducer device will be utilized to draw air over a UV lamp to generate the ozone (or other known devices to generate ozone) and/or hydroxyl gas in ozone and/or hydroxyls generator 3. The system may then introduce the ozone/hydroxyl gas into the fill water inlet 15 using either: (1) a venturi, (2) mixing valves, (3) diffusion, and (4) other possible methods.

In other embodiments, once the valve is open and fill water begins to start following through the fill water inlet 15, the water will flow through an ozone and/or hydroxyls generator 3. In some embodiments, once the water begins to flow, the ozone and/or hydroxyls generator system 3 may be switched on by a flow sensor, or may always be one during operation and will introduce ozone and/or hydroxyls gas into the fill lines.

Ozone and/or Hydroxyls Generation Systems

In order to dissolve or generate dissolve ozone and/or hydroxyls into feed water, many different systems and combinations of systems may be utilized: (1) a UV ozone and/or hydroxyls generator or (2) a dielectric (corona discharge) with a venture by-pass manifold, (3) diffusion systems that directly inject gas into the feed lines, (4) mixing valve or pump (5) an electrolytic generator system and (6) any other suitable systems. For example, ozone and/or hydroxyls can be generated from a feed gas of compressed ambient air, an oxygen concentrator or pure oxygen. As the feed gas is exposed to and electrical high voltage or plasma field the $O_2$ molecule divides into $O_1$ and reforms as $O_3$ or ozone and/or hydroxyls. To generate hydroxyls, the feed gas may be run through the path of UV light. Ozone and/or hydroxyls can vary in concentrations based on the feed gas. For example, the higher the concentration of oxygen the higher concentrations of ozone and/or hydroxyls are produced.

Ozone and/or hydroxyls can also be produced by applying UV light to an air supply (e.g. compressed ambient air) UV light with wave lengths between 185 and 254 nanometer wave lengths can create ozone and/or hydroxyls. Oxygen and humidity in the air will convert to OH, $O_3$ and other oxidative compounds. After generation of the ozone/hydroxyl gas, a venturi, mixing valve, diffusion system or other system may introduce the gas to dissolve it in the fill lines or chemical lines.

FIG. 1 illustrates a UV ozone and/or hydroxyls generator 3 that is downstream of the fill water supply line 14. During the fill process, the flow in the lines will cause ozone and/or hydroxyls to be generated based on UV light being radiated into gas (e.g. ambient air), while a venturi or other introducer will introduce the ozone/hydroxyl gas into the feed water that is flowing through the ozone and/or hydroxyls generation system 3. Accordingly, using the water fill lines 16, ozone and/or hydroxyls may be initially introduced into wash drum water during filling.

Ozone and/or Hydroxyls Introduction Into Chemical Lines

Ozone and/or hydroxyls may also be introduced through the chemical lines 22 in the during the wash cycle. This may be in addition to or separate from the ozone and/or hydroxyls system that introduces ozone and/or hydroxyls into the water fill lines 16. After the fill phase is complete or during the fill phase, chemicals are deposited through the chemical line 22 (which is separate from the fill system) into the wash drum 1 on quantities and timings based on the cycle selected and the current stage of the cycle. For example, detergent, bleach, and softener and other chemicals may be deposited into the wash drum 1 and various stages of the wash cycle.

The chemical line 22 injects chemicals that are stored in various chemical containers or drums 9 associated with the system. For example, in some embodiments, there may be a container 9 for detergent, one for bleach, one for fabric softeners and others. Once a specific chemical is needed, the chemical injection system control may trigger the initiation of the correct chemical pump 5 to begin pumping the chemical into a flush manifold 7 where it may be mixed with water from the water inlet 8. The control will send a signal to the chemical pump 5 to pump a certain amount of chemical from the chemical container 9 and also to open a valve (e.g. solenoid) on the water inlet 8 for a certain amount of time. The control system then controls the timing of the injection system, and begins to start pumping chemicals, and then after a delay opens the valve to the chemical water supply line 8. This will allow water and chemical to enter the flush manifold 7 at the same time to ensure proper mixing. In some embodiments, the chemical pump may also be told to leave the valve to the chemical water supply line 8 open for longer to allow more water to be flushed through the manifold 7 and into the drum 1, without adding further chemicals from the container 9. In this way, the control for the chemical line 22 may finely control the amount of chemical and water mixture that is pumped into the drum 1 from the container 9 and the chemical water supply line 8. Accordingly, with different timings, various amounts of water from the inlet 8 and chemicals from the container 9 may be added, in varying flow rates, dilutions, and timings. In some embodiments, a dummy chemical pump 5 may be included that is not connected to a chemical container 9, but is connected to the chemical water supply line 8. Accordingly, the dummy chemical pump 5 may then send a signal to a valve on the chemical water supply line 8 that allows water to flow through the chemical water supply line 8 and flush manifold 7 to the drum 1 without adding additional chemicals.

After the chemicals and water have mixed in the flush manifold 7, the chemical and water mixture exits the manifold 7 and enters the flush manifold output 4. Then, the chemicals travel through the ozone and/or hydroxyls generator 3 to the chemical water inlet 2, where they are injected into the chemical chute or hopper 10. Once the water/chemical mixture enters the chemical chute 10, in then enters the wash drum 1 to mix with the wash water and disinfect and clean the soiled laundry. The chemical line may include a control that may have more precise control over the flow rates of injection into the drum then the fill water injection system. This is because, the fill water inlet 15 and associated lines are meant to quickly fill the drum 1 with water at the beginning of the cycle. However the chemical line 22 and associated lines are meant to more precisely enter smaller amounts of chemical and water mixture into the drum 1 and therefore provide a more precise way of entering chemicals. Furthermore, the flow rates on the chemical supply lines are generally less than the flow rates on the water fill lines.

In order to inject ozone and/or hydroxyls into the chemical lines 22 an ozone and/or hydroxyls generator 3 may be placed at various points along the chemical fill lines 22. In some embodiments, the ozone and/or hydroxyls generator 3 may be downstream from the flush manifold 7 in order to introduce ozone and/or hydroxyls into the chemical line 22 at the last time possible prior to entering the chemical chute 10 and wash drum 1, to minimize off gassing and ozone and/or hydroxyls reactivity prior to entering the drum 1. In other embodiments, the ozone and/or hydroxyls generator 3 may be upstream from the flush manifold 7 but downstream from the chemical water supply line 8. In still other embodiments, the ozone and/or hydroxyls generator may be upstream from a chemical pump 5 that is linked to an ozone and/or hydroxyls generator 3 rather than a chemical container 9.

In some embodiments, various types of ozone and/or hydroxyls generators may be utilized for certain configurations for injecting ozone and/or hydroxyls into the chemical lines 22. For example, FIG. 1 illustrates a UV based ozone and/or hydroxyls generator downstream of the flush manifold. In this embodiment, the UV generator may be switched on whenever there is flow through the ozone and/or hydroxyls generator 3, for instance, by using a flow switch upstream or downstream from the ozone and/or hydroxyls generator 3. In some embodiments, such a UV ozone and/or hydroxyls generator 3 may remain in operation, and when the flow lines in the chemical injection system were turned on, the system would inject ozone and/or hydroxyls into the water stream as water passed through and the venturi or other gas introduction system dissolved the ozone/hydroxyl gas into the water stream.

Figure 2:
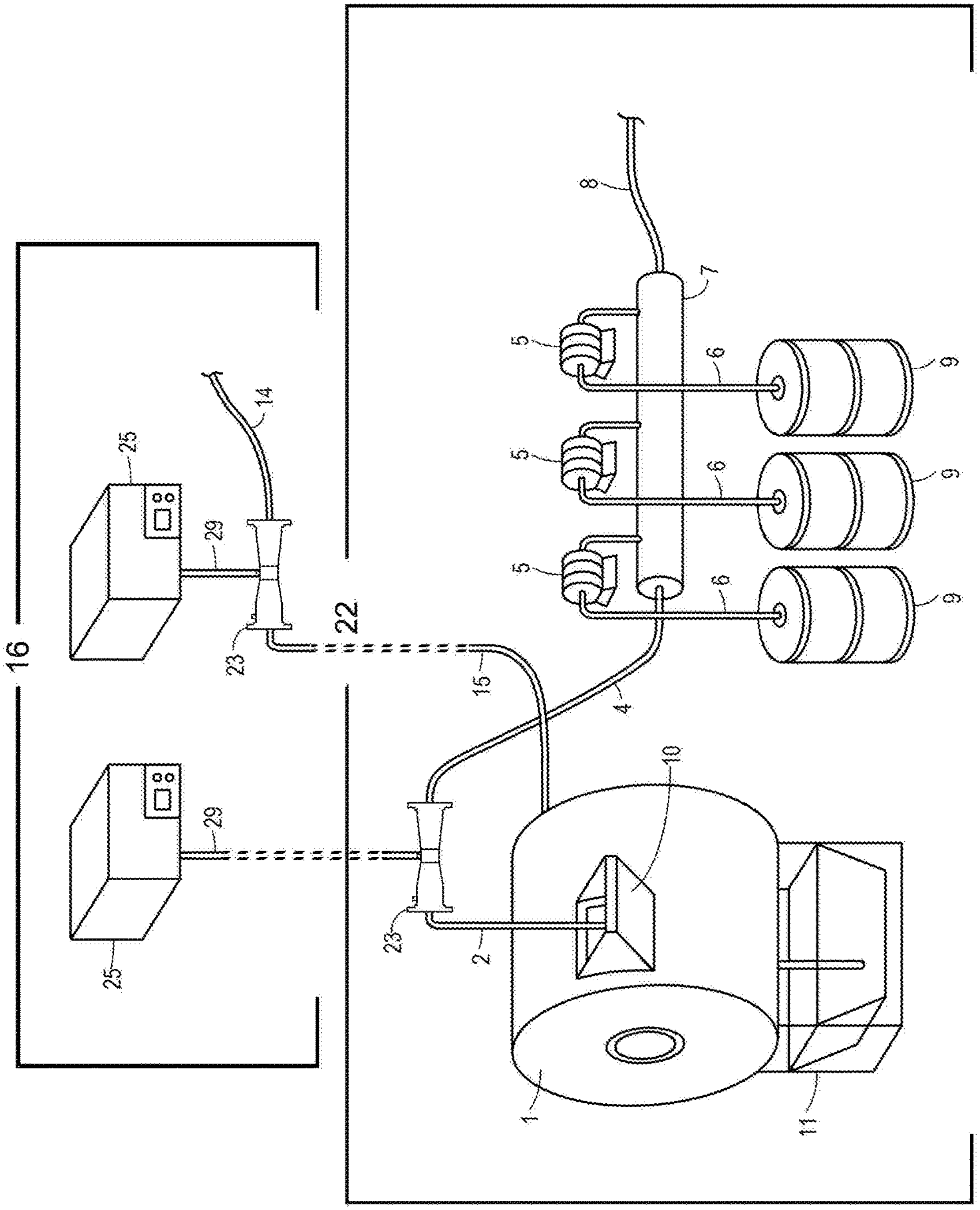
FIG. 2 is a diagram of another embodiment of an ozone and/or hydroxyls laundry machine according to the present disclosure.

FIG. 2 illustrates another embodiment of the system that includes ozone and/or hydroxyls generators 25 that are ozone and/or hydroxyls gas generators 25 (e.g., dielectric corona discharge). In this embodiment, ozone and/or hydroxyls gas is generated and must be mixed in the water/chemical lines' liquid in order to dissolve the ozone and/or hydroxyls gas and be useful once injected into the wash drum 1. In embodiments where ozone and/or hydroxyls gas generators 25 are used, various methods may be utilized to mix the ozone and/or hydroxyls gas into the water or water chemical mixture so that the ozone and/or hydroxyls gas dissolves into the liquid.

For example, in some embodiments, a venturi system may be utilized. In those embodiments, the ozone and/or hydroxyls generators 25 may be operational during a wash cycle, creating ozone and/or hydroxyls gas that remains contained in an ozone and/or hydroxyl gas supply line 29 until utilized. In those embodiments, the gas be back stopped at the venturi until water or water/chemical mixture begins to flow through the flush manifold output and chemical supply line through the venturi 23. Accordingly, the ozone and/or hydroxyl gas will not be dissolved or mixed unless water is flowing through the lines of the chemical injection system into a wash drum 1. This system has a distinct advantage in that the ozone and/or hydroxyls generator itself is not required to be turned on and off. Rather, the flow through the introducer (e.g. venturi) 23 will cause gas to be automatically drawn out of the ozone and/or hydroxyls gas supply line 29 and dissolve into the liquid/chemical mixture in the chemical supply line 2. As mentioned previously, the introducer 23 may also be situated upstream of the flush manifold 4 and along the chemical water supply line 8. However, in this embodiment, there may be greater off gassing as the water would have to travel further prior to entering the wash drum 1 with ozone and/or hydroxyl dissolved.

Other introducers 23 for introducing the ozone and/or hydroxyl gas into the liquid of the water fill lines 16 and/or the chemical line 22 may be utilized. For example, mixing pumps may be utilized that are switched on and off as the chemical supply line is turned on for each stage of the wash cycle. However, these embodiments may require extra valves and equipment in comparison to the venturi embodiment. In some embodiments, a venturi system may be utilized with a gas valve that opens and closes the ozone and/or hydroxyls gas supply line 29. In other embodiments, direct diffusion of ozone and/or hydroxyls into the various portions of the fill lines and chemical supply lines may be utilized. This method may also require a valve to close and open the gas supply lines 29, and may have less of ozone and/or hydroxyls dissolved into the liquid and accordingly more off gassing once the liquid enters the washer drum 1.

Ozone/Hydroxyl Injection Systems that Utilize Gas Introduction

Figure 3:
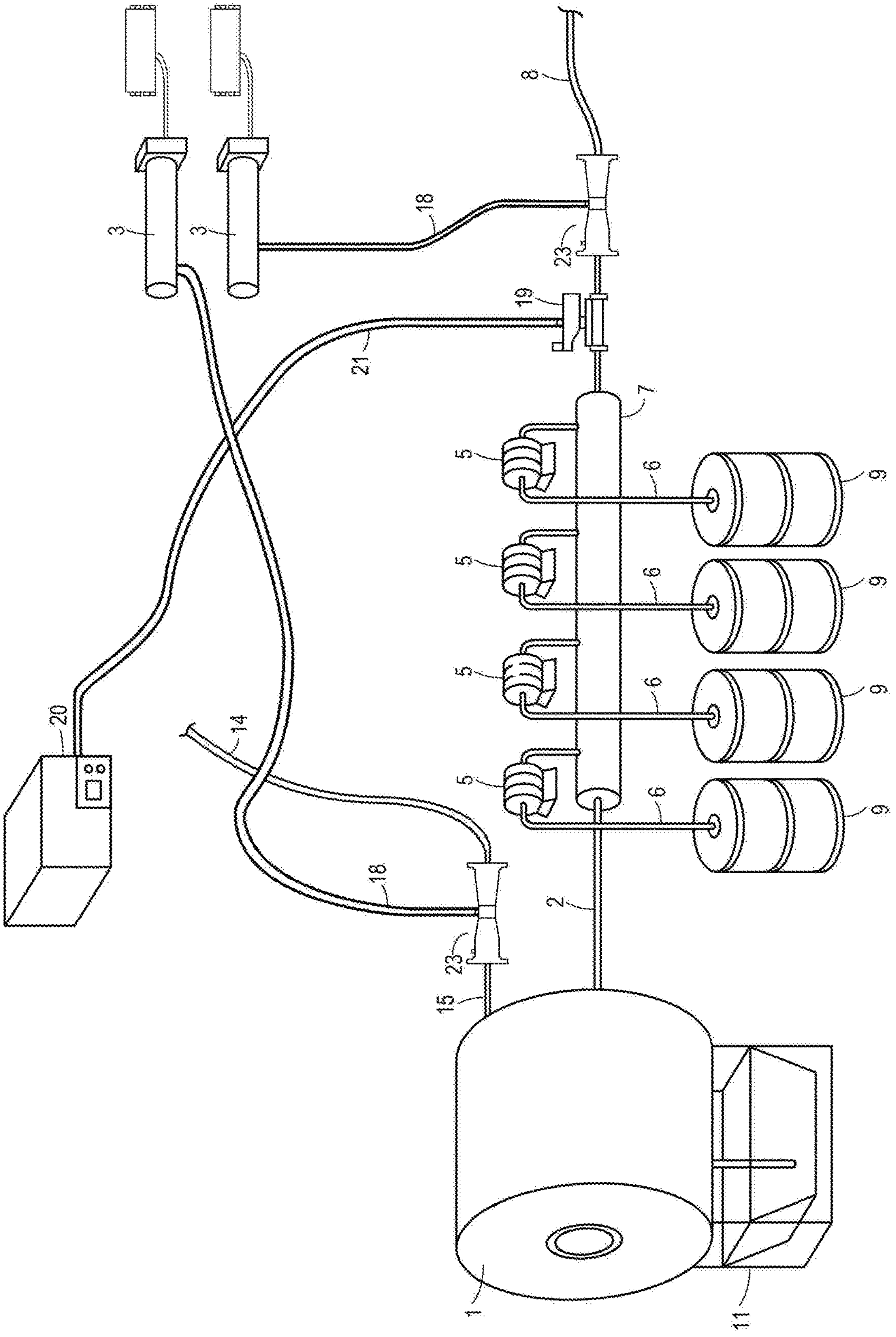
FIG. 3 is a diagram of another embodiment of an ozone and/or hydroxyls laundry machine according to the present disclosure.
Figure 4:
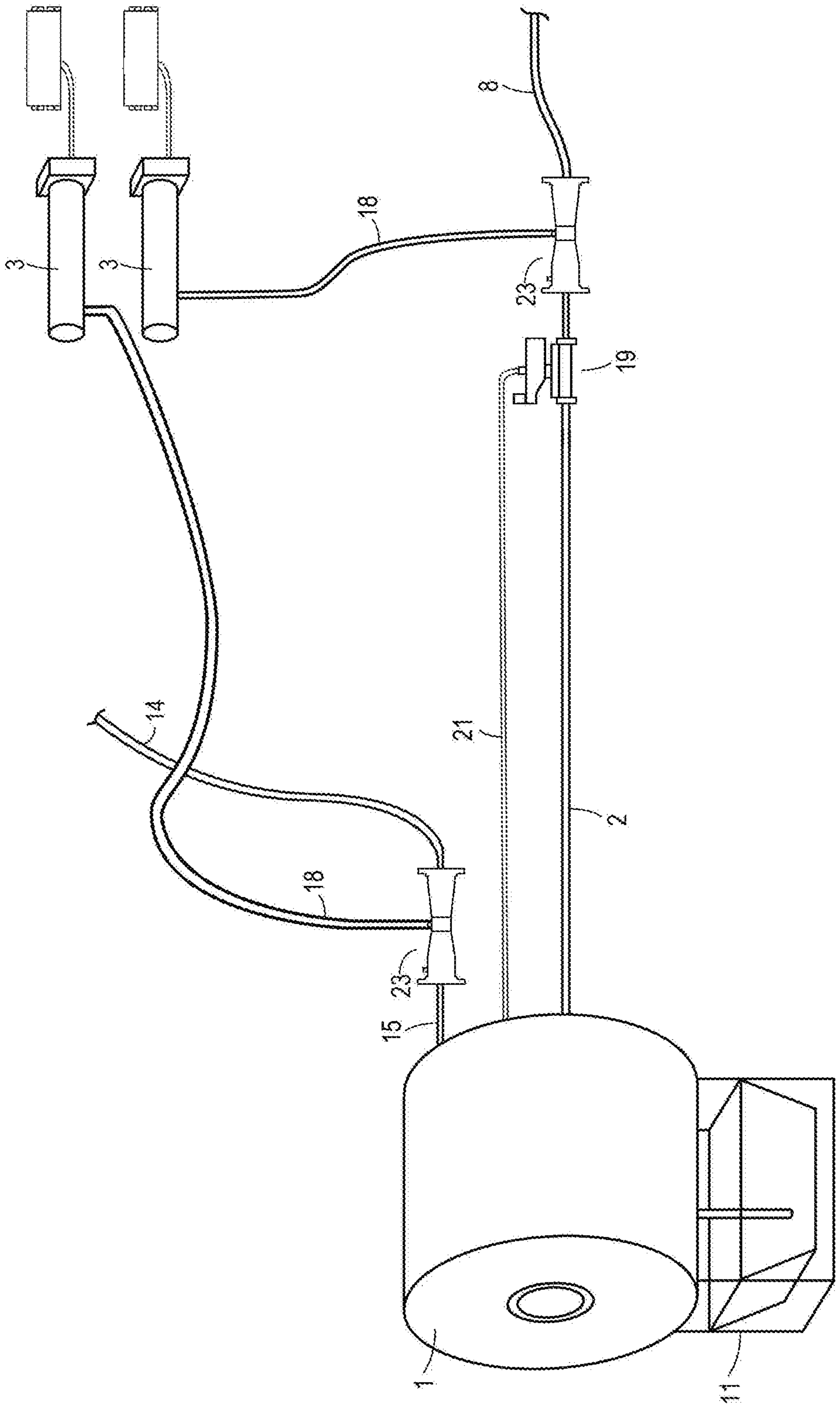
FIG. 4 is a diagram of another embodiment of an ozone and/or hydroxyls laundry machine according to the present disclosure.

FIGS. 3 and 4 illustrate example systems that generate gaseous ozone and/or hydroxyl charged gas that may be diffused into the water lines 16 and/or the chemical line 22. The gas is generated by an ozone or hydroxyl generator(s) 3 that emit the gas into gas supply lines 18 that connect to the water line 14 and/or chemical lines 22. The gas may be introduced into the supply lines through an number of introducers 23 including: a venturi, mixing process, diffusion process, or other process as disclosed herein.

In some embodiments, a venturi valve introduces the ozone in the water fill supply line 14 upstream of the fill water inlet 15 into the wash drum 1. In some embodiments, a second venturi may introduce the gas upstream of the manifold 7 and prior to the chemical pumps adding chemicals into the chemical water supply line 8 as illustrated in FIG. 3. In this embodiment, the gas generator 3 may be able to generate gas to two different gas supply lines 18, so that the single generate (or combination of multiple generators) can feed the fill water supply line 14 and the chemical water supply line 8. This is in contrast to the systems in FIGS. 1 and 2 that require separate ozone and/or hydroxyl generators 3 for each supply line. Accordingly, the arrangement illustrated in FIGS. 3 and 4 minimizes the equipment utilized, and simplifies the construction. This makes the unit more efficient and cost effective than prior units.

Also in this embodiment, a valve 19 is positioned upstream of the manifold 7 and downstream of the introducer 23. Valve 19 may be a solenoid valve or other suitable valve 19. In some examples, valve 19 may be controlled by control system 20, and allow solenoid valve to open so that the valve 19 allows water from the chemical water supply line 8 to pass over the introducer 23. If the gas generator 3 is actively producing ozone or hydroxyls through gas supply lines 18 while the solenoid valve 19 is open, then introducer 23 will draw in and dissolve some of the gas into the chemical supply line 8.

After the water is charged with ozone or hydroxyl gas from the chemical water supply line 8, the charged water flows through the flush manifold 7, and chemicals may be pumped into the flush manifold 7 (or other chemical integration system) from the chemical drums 9, that flow through the chemical supply lines 6, to the chemical pumps 5. Then the charged water will be mixed with chemicals and expelled to the flush manifold output 4. Accordingly, from there, the flush manifold output 4 will dispense the mixture into the chemical water inlet 2 on the drum 1.

Accordingly, through use of the control system 20, the valve 19 can be opened for varying amounts of time, and the gas generator 3 can be turned out for the entire portions of the time when the valve 19 is open. Also, the chemical pumps 5 may pump various chemicals into the flush manifold (e.g. detergent, bleach, etc.), at various times while valve 19 is open and the water from the chemical supply line 8 is flowing. Accordingly, varying amounts of chemicals and ozone or hydroxyl charged water may be added to the drum 1 through the chemical supply inlet 2.

In some examples, the solenoid valve will remain open for 99 seconds (the maximum for some manufacturers for each portion of the cycle) and the gas generator 3 may be generating hydroxyl gas (or ozone) at 900 ppm for the 99 seconds. This will be repeated for each stage where chemicals or water is added to the drum 1 through the chemical water supply line 8. For instance, many cycles may include a (1) detergent adding/wash phase, (2) bleach, (3) rinse, (4) spin, etc. For each of these phases, the chemical fill line 8 may remain open using the valve 19 for 99 seconds during each phase of the cycle, regardless of whether chemicals are being added by the chemical pumps 5 to the flush manifold 7. Accordingly, this may be one way to maximize the amount of hydroxyl charged water added. In other examples, (e.g. for less heavily soiled loads), the gas generator 3 may be turned on for less than the 99 seconds (e.g. 60 seconds, 70 seconds, 80 seconds, 90 seconds, etc.) for each portion of the cycle.

Additionally, the inventors have discovered one particular arrangement that is quite effective utilizes hydroxyl generators 3 (true hydroxyl generators that generate gas charged with 900-1000 ppm of hydroxyl gas or similar concentrations) in the arrangement of FIG. 3. Accordingly, the inventors have discovered that utilizing this, they can dramatically lower the rewash rate.

The laundry industry measures its cleaning results based on a rewash percentage. Most traditional wash processes using hot water have a rewash rate of 3-5%. Our system has consistently cleaned the same type of linen with a rewash rate of 1-2%. This success is with little to no hot water and a slight reduction in traditional wash chemistry. It goes without saying that the reduction in rewash saves a lot of time and money for the customer.

FIG. 4 illustrates another embodiment using gaseous introduction of a single (or combination) generator 3 that includes two gas supply lines 18 to supply both (1) the fill water supply line 14, and (2) the chemical water supply line 8. In this embodiment, illustrated is a similar system to FIG. 3, however, the chemical supply line is no longer is connected to the flush manifold 7, chemical drums 9, and chemical pumps 5. Rather, the gaseous feed line for the chemical water supply line 8 is utilized only for injecting hydroxyl radical charged water into the wash drum 1.

Additionally, the control system 20 is instead included in the wash system controls that come available with commercial units, or an addition a control system 20 may be attached to the wash drum 1 to regulate the valve 19 (e.g. solenoid valve) that controls how much chemical supply water 8 enters the wash drum after passing over the introducer 23 to add the hydroxyl gas or ozone gas. This may be beneficial, if a system is developed that only requires hydroxyl charged water, rather than chemicals as well.

Control Systems for Ozone and/or Hydroxyl Gas Introduction

Adding ozone and/or hydroxyls to the washer drum 1 through the chemical line 22 has many advantages over systems that only either: add the ozone to the fill lines, recirculate ozone using pumps, or directly injecting it into the drum 1. First, with respect to systems that only injecting ozone into the water fill lines 16, as described above, those systems greatly limit the amount and concentration of the ozone for the majority of the wash cycle as the ozone is generally only added in the beginning of the wash cycle. Furthermore, with the recirculation systems, the ozone may be maintained at higher levels, however, the system is quite expensive, and is prone to high maintenance requirements. Particularly, as additional plumbing is required, the pumps and recirculation system may clog with lint, and require additional electricity to run which ultimately may eliminate the efficiency gains of using an ozone laundry system.

Accordingly, the ozone and/or hydroxyls system presently disclosed has the advantage of adding dissolved ozone and/or hydroxyls to the chemical lines 22 that already add liquid and chemicals into the wash drum 1, and therefore, the addition of ozone and/or hydroxyls generally does not add additional liquid. This is advantageous, as additional liquid would generally dilute the concentration of the cleaning chemicals in the ozone and/or hydroxyls drum. Furthermore, the control and pump system for the chemical lines 22 already exists and would be installed with a laundry unit, and therefore adding an ozone and/or hydroxyls injection point along the chemical lines 22 would be not add considerably to the cost or labor of installation, except for the addition of the ozone and/or hydroxyls units. Therefore, this will allow ozone and/or hydroxyls to be injected in the laundry system through the ozone and/or hydroxyls cycle.

For example, varying amounts and concentrations of ozone and/or hydroxyls may be added to the washer drum 1 by way of the control system manipulating the timing and control of the chemical lines 22. As discussed above, the chemical pumps may be controlled by the chemical control system to dilute the chemicals with more or less water from the chemical water supply line 8. Generally, the control system sends a signal to the chemical pump 5 which controls the amount of chemicals pumped from the containers 9. In turn, the chemical pump 5 then controls or relays the control signal to the chemical water supply line 8 to determine the amount of water also mixed with the chemicals in the manifold 7. In other embodiments, the control system may be configured to directly control the chemical water supply line 8.

For many embodiments discussed herein, ozone and/or hydroxyls may be effectively added at any time the ozone and/or hydroxyls generator is operating and water is flowing through the chemical lines of the chemical injection system. Accordingly, if the control system sends a signal to turn on a chemical pump 5, but also instructions to add more water from the chemical water supply line 8 than usual, more ozone and/or hydroxyls will be introduced into the wash drum 1 than for a typical chemical injection. As another example, the dummy chemical pump 5 may also be switched on to initiate water flowing from the water inlet 8 in order to add additional ozone and/or hydroxyls into the wash drum 1 without adding more chemicals. Therefore, because the chemical line 22 is utilized, the precise amounts of ozone and/or hydroxyls enriched water that is added to the wash drum 1 may be more finely regulated. For example, it may be desired to keep the ozone and/or hydroxyls levels at 0.5 ppm, 1 ppm, 2 ppm, or other concentrations. It has been discovered that using the systems disclosed herein, for example, the ozone and/or hydroxyls concentration in the wash drum may be maintained at 1 ppm for various types of wash cycles throughout the cycle.

For instance, if the flow rate through chemical injection system is known along with the amount of ozone and/or hydroxyls injected by the ozone and/or hydroxyls introduction system into the chemical lines per ounce of water that flows through, the amount of ozone and/or hydroxyls in ounces or other units being deposited into the wash drum 1 may be calculated. Accordingly, the amount of ozone and/or hydroxyls needed to be added to appropriately raise the ozone and/or hydroxyls levels in the wash system to a desired ozone and/or hydroxyls level may be calculated. In some embodiments, a feedback system may be implemented with an ozone and/or hydroxyls sensor (or several sensors) in the wash drum 1 that send an indication of the ozone and/or hydroxyls levels in the wash drum 1 to the controller to allow the controller to determine the amount of ozone and/or hydroxyls needed to be added to the wash drum 1 to bring the ozone and/or hydroxyls levels up to the appropriate concentration. Then, the controller may then determine the precise control logic required to command the chemical/dummy pumps 5 and/or water inlet 8 to deliver the needed amount of ozone and/or hydroxyls to the wash drum 1. This disclosed system provides a thorough cleaning of wash loads by maintaining ozone and/or hydroxyls levels through the wash cycle.

Although the ozone and/or hydroxyls system has been described with respect to these two embodiments, various other embodiments may be implemented that inject ozone and/or hydroxyls into various points along the chemical line and take advantage of the already sophisticated water/chemical injection system in place.

Computer & Hardware Implementation of Disclosure

It should initially be understood that the disclosed control systems 20 herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "control system" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The invention claimed is:

1. A hydroxyl laundry chemical injection system comprising:

a hydroxyl gas generator configured to generate hydroxyl gas;

a first hydroxyl gas introducer coupled to a chemical water supply line and the hydroxyl gas generator, the first hydroxyl gas introducer configured to receive water from the chemical water supply line and hydroxyl gas from the hydroxyl gas generator;

a flush manifold configured to receive chemicals via one or more chemical supply lines and configured to receive a mixture of water and hydroxyl gas from the first hydroxyl gas introducer;

a wash drum configured to receive a mixture of water, hydroxyl gas, and chemicals from the flush manifold via a chemical water inlet during one or more wash cycles of a wash session;

a water fill line configured to introduce water into the wash drum;

a second hydroxyl gas introducer coupled to the water fill line and the hydroxyl gas generator, the second hydroxyl gas introducer configured to receive water from the water fill line and hydroxyl gas from the hydroxyl gas generator to provide a mixture of hydroxyl gas and water to the wash drum via a water fill inlet; and a valve coupling the flush manifold to the first hydroxyl gas introducer, the valve being configured to control flow of the mixture of water and hydroxyl gas from the first hydroxyl gas introducer.

2. The hydroxyl laundry chemical injection system of claim 1, further comprising one or more chemical containers coupled to the one or more chemical supply lines, wherein one of the one or more chemical containers contains detergent.

3. The hydroxyl laundry chemical injection system of claim 1, wherein the hydroxyl gas generator is configured to generate hydroxyl gas with a concentration of hydroxyl radicals of at least 800 ppm.

4. The hydroxyl laundry chemical injection system of claim 1, wherein the hydroxyl gas generator is configured to generate hydroxyl gas with a concentration of hydroxyl radicals of at least 900 ppm.

5. The hydroxyl laundry chemical injection system of claim 1, wherein the one or more wash cycles include a detergent cycle, a bleach cycle, a rinse cycle, a spin cycle, or any combination thereof.

6. The hydroxyl laundry chemical injection system of claim 1, wherein when the valve is open, the first hydroxyl gas introducer is configured to draw in and dissolve hydroxyl gas to create the mixture of water and hydroxyl gas.

7. The hydroxyl laundry chemical injection system of claim 1, further comprising a controller communicatively coupled to the valve, the controller being configured to cause the valve to introduce hydroxyl gas into the chemical water supply line for a predetermined time during at least a portion of at least one of the one or more wash cycles.

8. The hydroxyl laundry chemical injection system of claim 7, wherein the predetermined time is between about 60 seconds and about 99 seconds.

9. The hydroxyl laundry chemical injection system of claim 7, further comprising one or more chemical pumps configured to facilitate delivering the chemicals to the flush manifold via the chemical supply lines.

10. The hydroxyl laundry chemical injection system of claim 9, wherein the controller is communicatively coupled to the one or more chemical pumps and configured to cause the one or more chemical pumps to deliver a predetermined volume of the chemicals into the flush manifold.

11. The hydroxyl laundry chemical injection system of claim 1, wherein the hydroxyl gas generator is configured to be switched between and on state and off state, and wherein the flush manifold receives the mixture of water and hydroxyl gas from the first hydroxyl gas introducer when the hydroxyl gas generator is in the on state.

12. The hydroxyl laundry chemical injection system of claim 1, wherein the hydroxyl gas generator is a combination of multiple generators including a first generator and a second generator, the first generator coupled to the first hydroxyl gas introducer and configured to generate hydroxyl gas, and the second generator coupled to the second hydroxyl gas introducer and configured to generate hydroxyl gas.

* * * * *